(12) United States Patent
Lu et al.

(10) Patent No.: US 8,411,068 B2
(45) Date of Patent: Apr. 2, 2013

(54) METHOD FOR DETECTING USERS' PRESSING ACTION AND OPTICAL OPERATING UNIT

(75) Inventors: Chih-Hung Lu, Hsinchu (TW); Hui-Hsuan Chen, Hsinchu (TW)

(73) Assignee: Pixart Imaging Inc., Hsinchu (TW)

( * ) Notice: Subject to any disclaimer, the term of this patent is extended or adjusted under 35 U.S.C. 154(b) by 971 days.

(21) Appl. No.: 12/108,760

(22) Filed: Apr. 24, 2008

(65) Prior Publication Data

US 2009/0267918 A1 Oct. 29, 2009

(30) Foreign Application Priority Data

Dec. 25, 2007 (TW) .............................. 096150049 A

(51) Int. Cl.
*G06F 3/042* (2006.01)
(52) U.S. Cl. ...................... 345/175; 250/206.1; 250/221; 356/35.5; 382/115; 382/124; 382/125; 382/126; 382/127; 345/156; 178/18.09
(58) Field of Classification Search .................. 345/175, 345/156, 166; 250/206.1, 221; 356/35.5; 382/115, 124–127; 178/18.09
See application file for complete search history.

(56) References Cited

U.S. PATENT DOCUMENTS

| | | | | |
|---|---|---|---|---|
| 6,166,370 A * | 12/2000 | Sayag | ............................ | 250/221 |
| 6,408,087 B1 * | 6/2002 | Kramer | ......................... | 382/124 |
| 7,239,304 B2 * | 7/2007 | Hoshino et al. | ............... | 345/175 |
| 7,313,255 B2 * | 12/2007 | Machida et al. | .............. | 382/107 |
| 7,382,360 B2 * | 6/2008 | Mackey et al. | ............... | 345/173 |
| 7,627,150 B2 * | 12/2009 | Abiko et al. | ..................... | 382/124 |
| 7,663,609 B2 * | 2/2010 | Miyata et al. | .................. | 345/173 |
| 8,106,885 B2 * | 1/2012 | Lowles et al. | .................. | 345/166 |
| 8,294,670 B2 * | 10/2012 | Griffin | .......................... | 345/157 |
| 2003/0021451 A1 | 1/2003 | Lee | | |
| 2003/0025897 A1 * | 2/2003 | Iwai | ................................ | 356/71 |
| 2003/0044051 A1 * | 3/2003 | Fujieda | ......................... | 382/124 |
| 2004/0208348 A1 * | 10/2004 | Baharav et al. | ............... | 382/124 |
| 2005/0225538 A1 | 10/2005 | Verhaegh | | |
| 2006/0012570 A1 * | 1/2006 | Yumoto et al. | ................ | 345/157 |
| 2006/0280346 A1 * | 12/2006 | Machida | ........................ | 382/124 |
| 2008/0252616 A1 * | 10/2008 | Chen | .............................. | 345/175 |
| 2008/0259053 A1 * | 10/2008 | Newton | ......................... | 345/175 |
| 2009/0219261 A1 * | 9/2009 | Jacobson et al. | ............... | 345/175 |
| 2009/0251414 A1 * | 10/2009 | Chen et al. | ..................... | 345/163 |

FOREIGN PATENT DOCUMENTS

TW I280500 B 5/2007
WO 2004090709 A1 10/2004

* cited by examiner

*Primary Examiner* — Lun-Yi Lao
*Assistant Examiner* — Kelly B Hegarty
(74) *Attorney, Agent, or Firm* — Chun-Ming Shih

(57) ABSTRACT

A method for detecting users' pressing action is applied to an electronic apparatus which has at least an optical operating unit for an user to operate the electronic apparatus. The method includes the steps of detecting a deformation of a forcing object which forces the optical operating unit; and determining whether the user performs a pressing action according to a deformation degree of the forcing object. Further, an optical operating unit using the method is provided.

5 Claims, 2 Drawing Sheets

METHOD FOR DETECTING USERS' PRESSING ACTION AND OPTICAL OPERATING UNIT

BACKGROUND OF THE INVENTION

1. Field of the Invention

The present invention relates to a method for detecting users' pressing action, particularly to a method for detecting users' pressing action by optical method and an optical operating unit using the method.

2. Description of Related Art

With the progress of the plane display technique, more and more electronic products assembled with a screen. Many electronic products are operated by moving a cursor on screen. There are many operation interfaces to control the cursor. Touch pads are one kind of these operation interfaces which integrate with a function of moving the cursor and a function of the key. The capacitive touch pad and the resistive touch pad are popular touch pads. The resistive touch pad lacks good sensitive, so that the resistive touch pad may be damaged with strong force exerting thereon by a user. However, the capacitive touch pads have high cost, and are easily to make misoperation caused by electrostatic force or humidity.

The touch pads are not suitable for being applied to portable electronic apparatuses with small size (such as mobile phones). An U.S. Pat. No. 7,058,432 discloses a pointing device applies to a portable electronic apparatus with small size. This pointing device can detect a movement of a finger by an optical method to cause a corresponding movement of a cursor on the screen.

However, the above pointing device can move the cursor on the screen, but can not provides a pressing function. Another pressing key is needed for the user to perform the pressing action. Therefore, the above pointing device take a large space so that the size of the electronic apparatus can not be further reduced. Further, the production cost of the electronic apparatus is increased.

SUMMARY OF THE INVENTION

The present invention provides a method of detecting users' pressing action for performing a pressing function using an optical method.

The present invention also provides an optical operating unit to performing a pressing function using an optical method.

The present invention provides a method of detecting users' pressing action applied to an electronic apparatus. The electronic apparatus has at least an optical operating unit for an user to operate the electronic apparatus. The method of detecting users' pressing action includes the steps of: detecting a deformation of a forcing object which forces the optical operating unit, and determining whether the user performs a pressing action according to a deformation degree of the forcing object.

In one embodiment of the present invention, the step of detecting the deformation of the forcing object comprises using an image sensor of the optical operating unit to detect the deformation.

In one embodiment of the present invention, the forcing object has a texture structure with stripes, the step of detecting the deformation of the forcing object comprises detecting an interval variation degree between at least one of the two adjacent stripes, and when the interval variation degree is larger than a predetermined value, the pressing action performed by the user is detected.

In one embodiment of the present invention, the forcing object has a texture structure with stripes, the step of detecting the deformation of the forcing object comprises detecting a width variation degree between of at least one of the stripes, and when the width variation degree is larger than a predetermined value, the pressing action performed by the user is detected.

The present invention also provides an optical operating unit applied to an electronic apparatus. The optical operating unit includes a transparent element, a light source and an image sensor. The transparent element is disposed at an opening of a housing of the electronic apparatus. The transparent element is capable of bearing a forcing object exerted by an user. The light source is disposed in the housing and for providing a light beam to the transparent element. The forcing object reflects the light beam into the housing. The image sensor is disposed in the housing and disposed on a transmitting path of the light beam reflected by the forcing object. The image sensor is capable of detecting the light beam, converting the light beam to an image data and detecting a deformation of the forcing object on the transparent element according to the image data to determining whether the user performs a pressing action according to a deformation degree of the forcing object.

In one embodiment of the present invention, the forcing object has a texture structure with strips, and the deformation degree of the forcing object is an interval variation degree between at least one of the two adjacent strips.

In one embodiment of the present invention, the forcing object has a texture structure with strips, and the deformation degree of the forcing object is a width variation degree of at least one of the strips.

In one embodiment of the present invention, the image sensor is capable of detecting a movement of forcing object on the transparent element according to the image data and generating a corresponding movement of a cursor on a screen of the electronic apparatus.

In one embodiment of the present invention, the optical operating unit further includes a converging element disposed in the housing and disposed between the transparent element and the image sensor for converging the light beam.

The method of detecting users' pressing action of the present invention is used to determining whether the user performs a pressing action according to the deformation degree of the forcing object. Therefore, the optical operating unit using the method has a pressing function.

BRIEF DESCRIPTION OF THE DRAWINGS

These and other features and advantages of the various embodiments disclosed herein will be better understood with respect to the following description and drawings, in which like numbers refer to like parts throughout, and in which.

DETAILED DESCRIPTION

Figure 1:
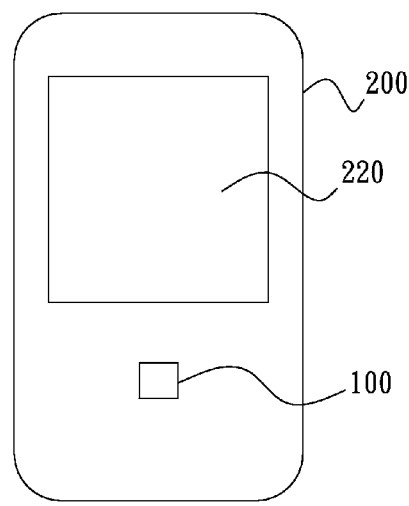
FIG. 1 is a schematic view of an electronic apparatus with an optical operating device of an embodiment of the present invention.
Figure 2:
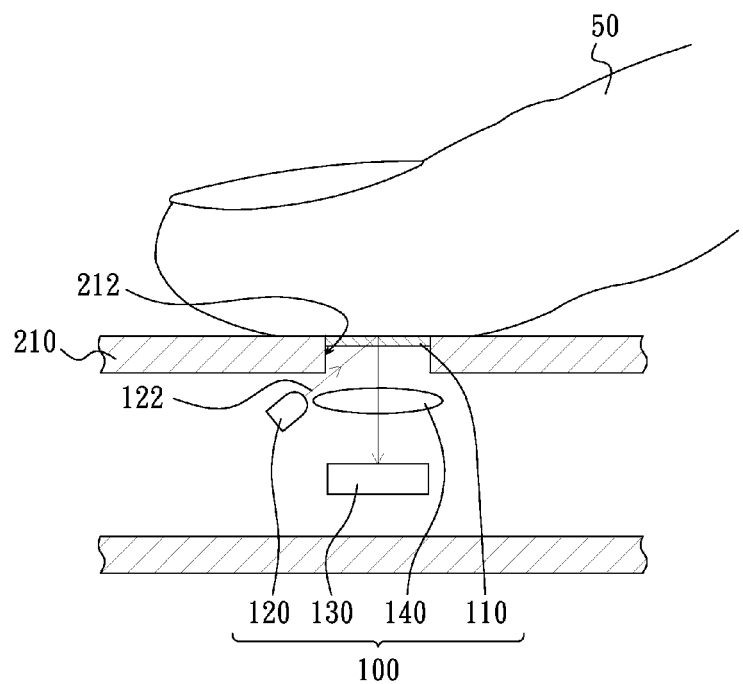
FIG. 2 is a schematic view of the optical operating unit of FIG. 1.

Referring to FIG. 1 and FIG. 2, an optical operating unit 100 is used in an electronic apparatus 200. The optical operating unit 100 includes a transparent element 110, a light source 120 and an image sensor 130. The transparent element 110 is disposed in an opening 212 of a housing 210 of the electronic apparatus 200. The transparent element 110 is capable of bearing a forcing object 50 (such as a finger) exerted by a user. The light source 120 is disposed in the housing 210 for providing a light beam 122 to the transparent element 110. The forcing object 50 reflects the light beam 122 into the housing 210. The image sensor 130 is disposed in the housing 210 and on a transmitting path of the light beam 122 reflected by the forcing object 50.

The optical operating unit 100 further includes a converging element 140 disposed in the housing 210. The converging element 140 is disposed between the transparent element 110 and the image sensor 130. The converging element 140 can alternatively includes one or more lens, or includes other optical element with a converging surface. The converging element 140 is capable of converging the light beam 122. The image sensor 130 can be a complementary metal oxide semiconductor (CMOS) image sensor or a charge coupled device (CCD). The image sensor 130 detects the light beam 122 and converts the light beam 122 to an image data.

The optical operating unit 100 in the embodiment of the invention can serve as a pressing key of the electronic apparatus 200. In other words, the optical operating unit 100 can detect a pressing action of an user. Detail descriptions of how to detecting users' pressing action will be disclosed as follow.

Figure 3:
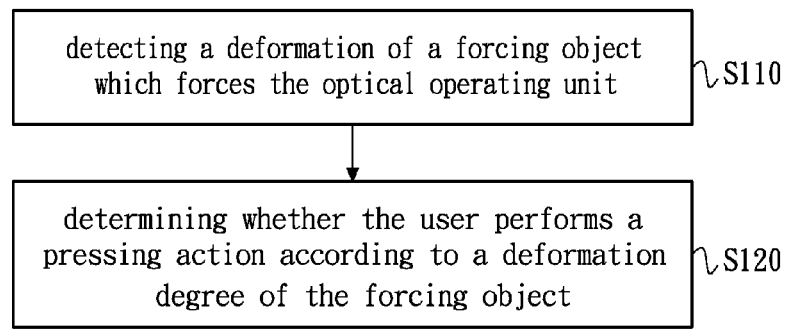
FIG. 3 is a flow chart of a method of detecting users' pressing action of an embodiment of the present invention.

Referring also to FIG. 3, a method for detecting users' pressing action of the present embodiment includes the following steps. First, as shown in step S110, a deformation of the forcing object 50 which forces the optical operating unit 100 is detected. Then, as shown in step S120, whether the user performs a pressing action is determined according to a deformation degree of the forcing object 50. In other words, the deformation degree of the forcing object 50 changes with different pressing forces exerting on the transparent element 110 by the forcing object 50. Therefore, the method of the embodiment of the present invention can determine whether the user performs a pressing action according to the deformation degree.

Further, the forcing object 50 has a texture structure with strips (such as fingerprint). When the forcing object 50 presses the transparent element 110 with a light force or presses the transparent element 110 with a strong force, the texture structure will be changed. For example, when the user presses the transparent element 110 with a light force, a partial image of the texture structure detected by the image sensor 130 is shown in a shadow area of FIG. 4. When the user presses the transparent element 110 with a strong force, a width of each strip of the texture structure is broadened, as shown in a broken line of FIG. 4.

Figure 4:
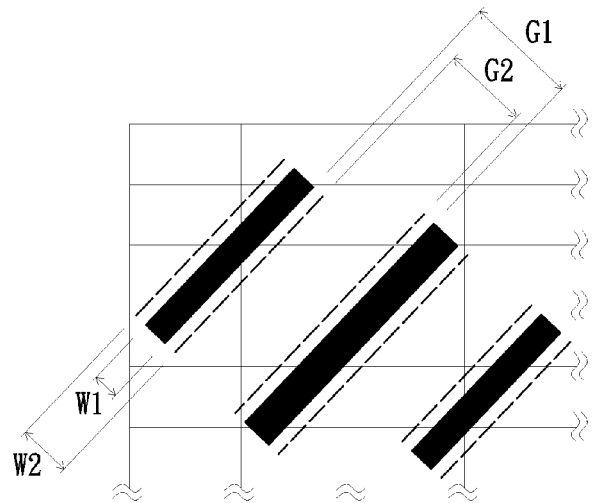
FIG. 4 is partial schematic view of a texture structure detected by an image sensor, when a pressing object presses a transparent element with a light/strong force.

The FIG. 4 shows that when the forcing object 50 presses the transparent element 110 with a strong force, an interval between two adjacent strips of the texture structure becomes narrow. Therefore, in the present embodiment of the present invention, the step of detecting the deformation of the forcing object 50 can be detecting an interval variation degree between at least one of the two adjacent strips of the texture structure. When the interval variation degree between two adjacent trips is larger than a predetermined value (e.g., 10%), a pressing action performed by a user is determined. For example, when the forcing object 50 presses the transparent element 110 with a light force, the interval between two adjacent strips of the texture structure is G1. When the forcing object 50 presses the transparent element 110 with a strong force, the interval between the same two adjacent strips of the texture structure is G2. When a value of (G1−G2)/G1 is larger than 10%, the pressing action performed by the user is determined.

Further, when the forcing object 50 presses the transparent element 110 with a strong force, a width of at least one of the strips of the texture structure becomes narrow. In the embodiment of the present invention, the step of detecting the deformation of the forcing object 50 can be detecting the width of at least one of the strips of the texture structure. When the width variation degree of the strip is larger than a predetermined value (e.g., 10%), the pressing action performed by the user is determined. For example, when the forcing object 50 presses the transparent element 110 with a light force, the width of one of the strips of the texture structure is W1. When the forcing object 50 presses the transparent element 110 with a strong force, the width of the same strip of the texture structure is W2. When a value of (W1−W2)/W1 is larger than 10%, the pressing action performed by the user is determined.

The optical operating unit 100 can detect users' pressing action by using an optical method, so that misoperation caused by electrostatic force or humidity will not occur. When a conventional pressing key is pressed, a forced object (i.e. pressing key) is urged to deform. The conventional pressing key may be damaged by an excess force. However, in the present invention, when the optical operating unit 100 is pressed, the forcing object 50 is deformed and the forced object (i.e. the optical operating unit 100) is not deformed. Thus, the optical operating unit 100 will not be damaged by an excess force. The reliability of the optical operating unit 100 is improved.

The predetermined value in the embodiment of the present invention is given by way of example, and not limitation. In the present invention, single interval variation degree between two adjacent stripes and single width variation degree of one of the trips are taken as examples. Alternatively, the present invention can detect users' pressing action according to at least one interval variation degree and at least one width variation degree of the trips.

In the embodiment of the present invention, the image sensor 130 can detect a movement of the forcing object 50 which forces the transparent element 110 according to the image data and generating a corresponding movement of a cursor on a screen 220 of the electronic apparatus 200. In other words, the optical operating unit 100 in the embodiment of the present invention has both pressing function and pointing function. Therefore, not only the size of the electronic apparatus 200 is accordingly reduced but also the production cost of the electronic apparatus 200 is reduced.

In summary, the present invention has following advantages:

1. The present invention using an optical method for detecting users' pressing action, so misoperation caused by electrostatic force or humidity will not occur.

2. In the present invention, because a deformation object is the forcing object, the optical operating unit will not be damaged by excess force exerted thereon. Therefore, the optical operating unit of the present invention has a better reliability.

3. The optical operating unit of the present invention has both pressing function and pointing function. Therefore, not only the size of the electronic apparatus is reduced but also the production cost of the electronic apparatus is reduced.

The above description is given by way of example, and not limitation. Given the above disclosure, one skilled in the art could devise variations that are within the scope and spirit of the invention disclosed herein, including configurations ways of the recessed portions and materials and/or designs of the attaching structures. Further, the various features of the embodiments disclosed herein can be used alone, or in varying combinations with each other and are not intended to be limited to the specific combination described herein. Thus, the scope of the claims is not to be limited by the illustrated embodiments.

What is claimed is:

1. A method of detecting users' pressing action applied to an electronic apparatus, the electronic apparatus having at least an optical operating unit for an user to operate the electronic apparatus, the method of detecting the users' pressing action comprising steps of:

detecting a deformation of a forcing object which forces the optical operating unit, the deformation of the forcing object being formed on a contacting surface of the optical unit and the forcing object; and determining whether the user performs a pressing action according to a deformation degree of the forcing object, wherein when the deformation degree is larger than a predetermined value, the pressing action performed by the user is determined;

wherein the forcing object has a texture structure with stripes, the step of detecting the deformation of the forcing object comprises detecting an interval variation degree between at least two adjacent stripes or detecting a width variation degree of at least one of the stripes, and when the interval variation degree between at least two adjacent stripes changes to a value of 90% or smaller of an unforced value or the width variation degree of at least one of the stripes changes to 110% or larger of an unforced value, the pressing action performed by the user is determined.

2. The method as claimed in claim 1, wherein the step of detecting the deformation of the forcing object comprises using an image sensor of the optical operating unit to detect the deformation.

3. An optical operating unit applied to an electronic apparatus, the optical operating unit comprising:

a transparent element, disposed at an opening of a housing of the electronic apparatus, the transparent element being capable of bearing a forcing object exerted by an user;

a light source, disposed in the housing for providing a light beam to the transparent element, and the forcing object reflecting the light beam into the housing; and an image sensor, disposed in the housing and disposed on a transmitting path of the light beam reflected by the forcing object, the image sensor being capable of detecting the light beam, converting the light beam to an image data and detecting a deformation of the forcing object on a contacting surface of the forcing object and the transparent element according to the image data to determine whether the user performs a pressing action according to a deformation degree of the forcing object, the forcing object having a texture structure with stripes, the stripes being deformable under pressure when forced against the transparent element, when a deformation degree of the forcing object is ten percent or larger than an unforced value, as measured by comparing a width of one of the stripes or a distance between adjacent stripes before and during forcing, the pressing action performed by the user is determined.

4. The optical operating unit as claimed in claim 3, wherein the image sensor is capable of detecting a movement of forcing object on the transparent element according to the image data and generating a corresponding movement of a cursor on a screen of the electronic apparatus.

5. The optical operating unit as claimed in claim 3, wherein the optical operating unit further comprises a converging element disposed in the housing and disposed between the transparent element and the image sensor for converging the light beam.

* * * * *